United States Patent [19]
Meiklejohn

[11] 3,840,965
[45] Oct. 15, 1974

[54] APPARATUS FOR MANUFACTURE OF SPOKE WHEELS

[75] Inventor: Ian Goodhall Meiklejohn, Fife, Scotland

[73] Assignee: I. G. Meiklejohn Co. Limited, Kirkcaldy, Fife, Scotland

[22] Filed: Sept. 15, 1972

[21] Appl. No.: 289,353

[30] Foreign Application Priority Data
Sept. 17, 1971  Great Britain ................... 43425/71

[52] U.S. Cl. .......... 29/208 D, 29/159.02, 29/200 B, 29/200 J, 29/211 R, 29/211 D, 228/4
[51] Int. Cl. ............................................. B23p 19/04
[58] Field of Search ........... 29/200 J, 200 B, 208 D, 29/211 R, 159.02, 159.01, 159.03, DIG. 3, 211 D; 228/4

[56] References Cited
UNITED STATES PATENTS

| | | | |
|---|---|---|---|
| 1,496,058 | 6/1924 | Kuniholm | 29/159.02 |
| 1,780,215 | 11/1930 | Wilson | 29/159.02 |
| 3,758,931 | 9/1973 | Patterson | 29/159.02 |

Primary Examiner—C. W. Lanham
Assistant Examiner—Victor A. DiPalma
Attorney, Agent, or Firm—Nathaniel A. Humphries

[57] ABSTRACT

This disclosure relates to a method of manufacturing wire-spoked wheels and to apparatus for use in said method. A jig is provided having a peripheral seat for receiving a rim of the wheel and having radially disposed guide blocks with bores passing therethrough. When the rim is seated in the jig apertures in the rim are aligned with the bores in the guide blocks before double-limb duplex spokes are inserted into the jig, the free ends of the spokes passing through the rim apertures and the bores until the spokes extend over at least one end of a hub. The spokes are then locked to the hub and simultaneously tensioned, and the wheel removed from the jig.

7 Claims, 7 Drawing Figures

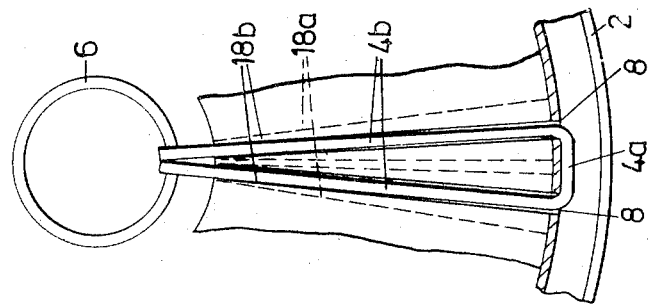
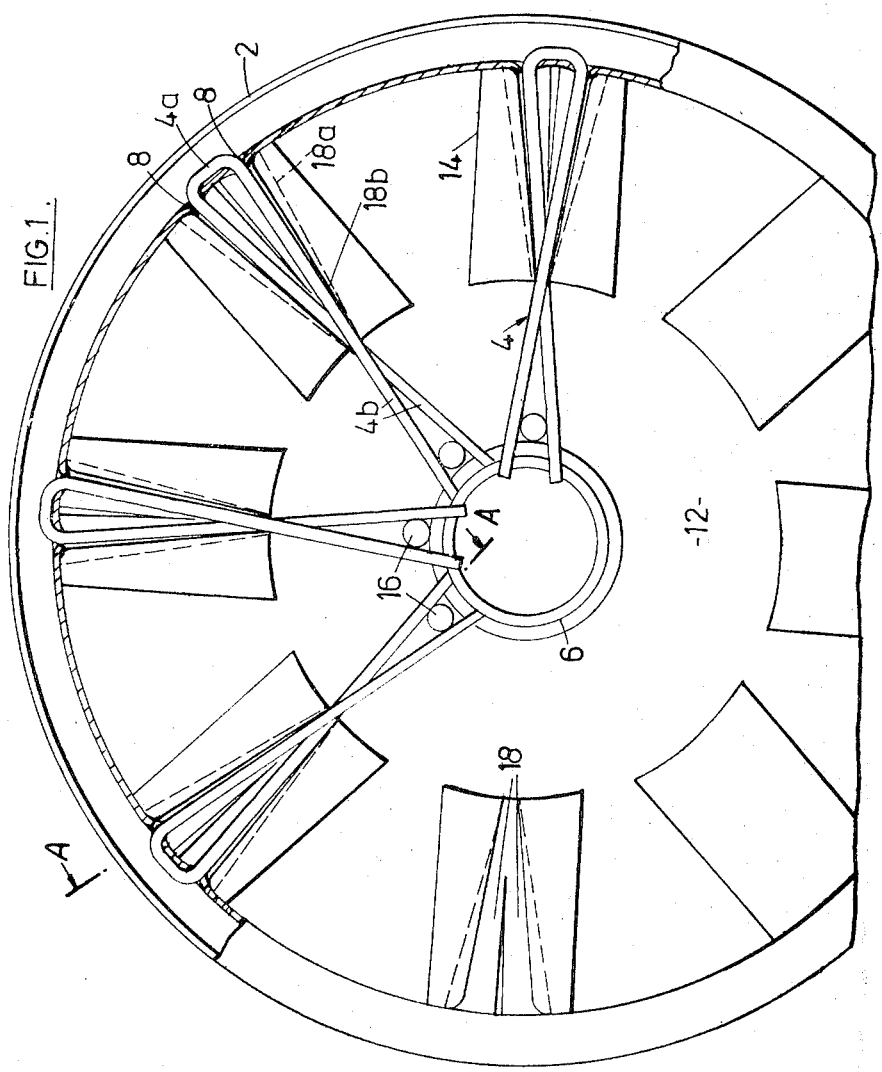

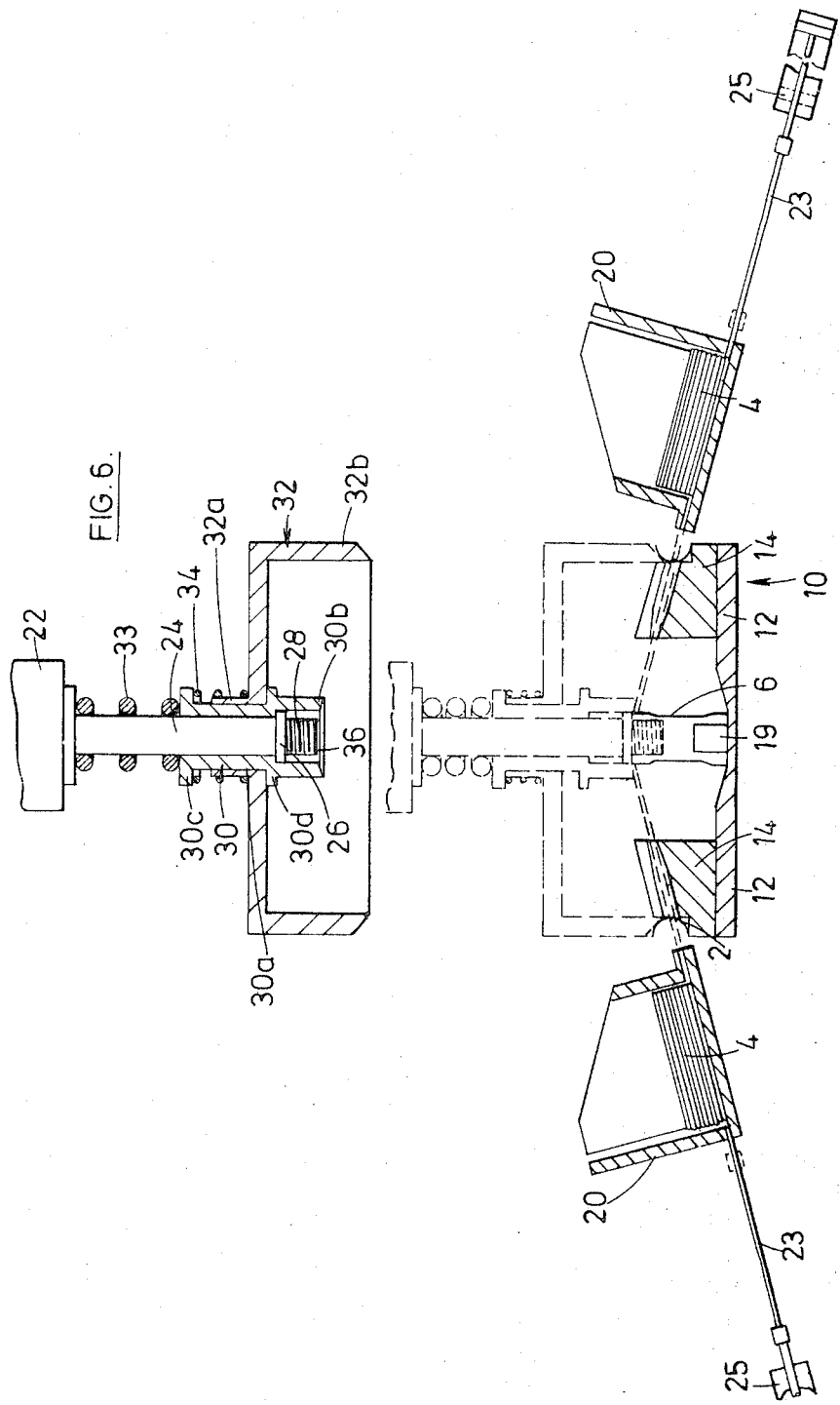

APPARATUS FOR MANUFACTURE OF SPOKE WHEELS

This invention relates to a method of manufacturing wire-spoked wheels of the type comprising a hub, a rim surrounding the hub and having therein peripherally spaced apertures, and a series of wire spokes interconnecting the rim and the hub and to apparatus for use in said method.

An object of the present invention is to provide for quick and easy manufacture of wire-spoked wheels.

According to the present invention there is provided apparatus for use in manufacturing a wire-spoked wheel of the aforesaid type including a jig having peripherally disposed positioning means comprising a peripheral seat to receive the rim and peripherally spaced radial guide passages opening from the seat for alignment with apertures in the rim, the guide passages being so angled that spokes can be fed radially inwards through the rim apertures to one end of the hub and means for securing the spokes to the hub.

According to the present invention there is also provided a method of manufacturing a wire-spoked wheel of the aforesaid type in a jig having peripherally disposed positioning means comprising a peripheral seat to receive the rim and peripherally spaced radial guide passages opening from the seat for alignment with apertures in the rim, including positioning a rim on said peripheral seat with the rim apertures aligned with the radial guide passages, locating a hub centrally in the jig, feeding into the jig a plurality of spokes each including a length of wire shaped to provide a head portion and a pair of limbs extending from the respective ends of the head portion, so that the limbs of each spoke pass through a corresponding pair of rim apertures and the radial guide passages to one end of the hub and the head portion engages the rim between the respective pair of rim apertures, and securing the ends of the limbs to said one end of the hub.

Embodiments of the invention will now be described by way of example with reference to the accompanying drawings, in which:

FIG. 1 is a plan view of a tangent spoked wheel in an assembly jig;

FIG. 5 is a partial plan view showing a direct spoke in a guide block; and

FIG. 6 is a diagrammatic view of a press tool in an open position, the closed position of the press tool being shown in dotted lines.

Figure 2:
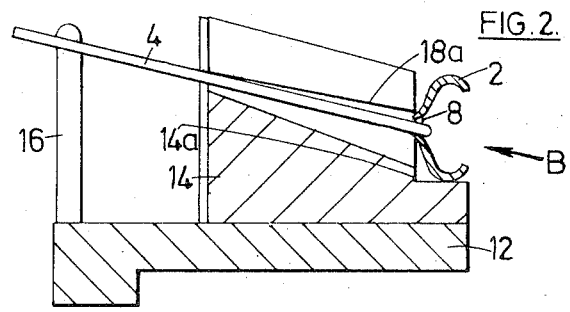
FIG. 2 is a section on the line A—A of FIG. 1, with the hub member removed.

Wheel parts for use in manufacturing a wire-spoked wheel consist of a channel-section rim 2, a plurality of duplex spokes 4 composed of pieces of round-section resiliently deformable wire bent to shape and each having a short, straight head portion 4a and a pair of straight limbs 4b extending from the respective ends of the head portion 4a and crossing each other about midway of their lengths, and a hub 6 composed of a cylindrical tube. The rim has in its base peripherally spaced pairs of through apertures 8, the spacing of the apertures 8 of each pair corresponding to the spacing of the limbs 4b of each duplex spoke 4 at the head portion 4a. Preferably the limbs 4b have conical free ends and the apertured zones of the rim base are offset inwards to present frusto-conical recesses which co-operate with the conical ends of the limbs 4b to guide the limbs 4b into the apertures 8.

Apparatus for use in manufacturing a wheel from the aforesaid parts comprises a jig 10 consisting of a horizontal annulus 12 with a series of positioning blocks 14 mounted on the periphery of the annulus 12.

Figure 3:
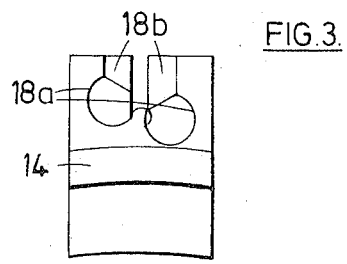
FIG. 3 is a view in direction of arrow B in FIG. 2.
Figure 4A:
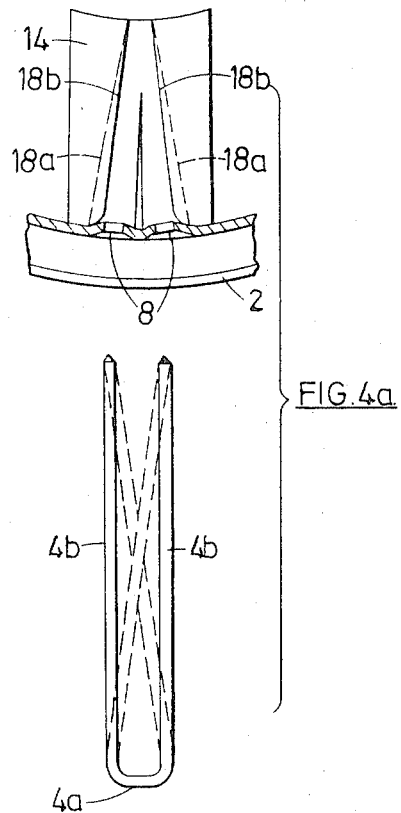
FIG. 4a is a plan view of a single guide block with a spoke shown in position for insertion into the block, the free form of the spoke being shown in dotted lines.
Figure 4B:
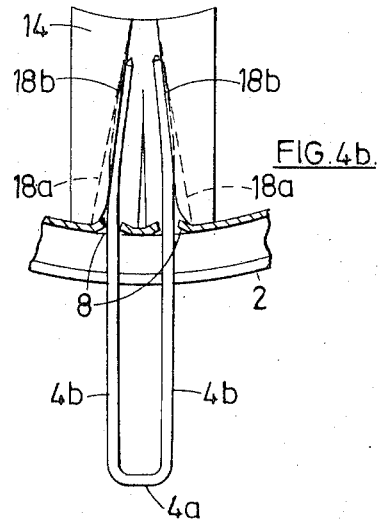
FIG. 4b is similar to the view of FIG. 4a but showing the spoke partly inserted into the block.

Each positioning block extends radially inwards from the outer periphery of the annulus 12 and an upstanding cylindrical pin 16 is provided at the inner periphery of the annulus 12 and aligned with the inner end of the block 14. Each block 14 has therein a pair of radial open-topped grooves 18 which cross each other to accommodate the limbs 4b of the duplex spoke 4 and which are sloped to deflect the duplex spoke 4 towards the upper end of the hub 6. The grooves 18 being open-topped permit upward movement of the deflected duplex spokes 4 clear of the blocks 14. Each groove 18 (FIG. 3) is formed of a particular-section bore 18a at the base and a parallel-sided slot 18b opening from the top of the bore 18a. Each upstanding pin 16 is positioned to form a wedge between the diverging limbs 4b emerging from the grooves in the respective block 14 and thereby facilitate location of the limbs 4b precisely around the periphery of the hub 6 with the inner end portions of the limbs lying over the ends of the hub 6. The pins 16 also serve to locate the hub 6 centrally. The outer ends of the blocks 14 are stepped to provide a peripheral seat 14a for the wheel rim 2 whereof the base abuts the vertical walls of the seat 14a and the apertures 8 register with the outer ends of the bores 18a in the block 14. A central pin 19 is upstandingly mounted on the jig 10. In a modification, the jig is formed as a unit possibly from a suitable plastics material.

A series of power-operated feed assemblies (FIG. 6) are arranged around the periphery of the annulus 12, each including a magazine 20 in which the duplex spokes 4 are stacked and which is removable for reloading with spokes 4, and a reciprocating blade 23 operable by a pneumatic piston and cylinder arrangement 25 and engageable with the head portion 4a of the lowermost duplex spoke 4 of the stack to force same radially inwards from the magazine 20 so that the limbs 4b of the spoke 4 penetrate first the rim apertures 8 and then the bores 18a of the block 14. The magazines 20 are inclined at the appropriate angle for feeding the spokes 4 such that the latter engage over the uppermost end of the hub 6. The duplex spokes of resiliently deformable wire, being free of any heads or other protuberances are eminently suited for loading into the magazines and for power discharge from the magazines.

A press tool as shown diagrammatically in FIG. 6 includes the jig 10 and an upper assembly comprising a press ram 22 and a pin 24 mounted at its upper end on the ram 22, and having an annular flange 26 and a nose portion 28 at its lower end. A spoke clamp cone 30 of generally tubular form has a collar section 30a, by means of which the cone 30 is slidably mounted on the pin 24, a clamping section 30b, an annular flange 30c, at its upper end and an annular flange 30d at the lower end of the collar section 30a. The cone 30 is biased towards the lowermost end of the pin 24 by means of a spring 33 which surrounds the pin 24 and extends between the ram 22 and the flange 30c. In its lowest position the clamping section 30b of the cone 30 surrounds and extends below the nose portion 28.

A rim clamp 32 has a collar section 32a slidably mounted on the collar section 30a of the cone 30 and an enlarged diameter clamping section 32b. The clamp 32 is biased into engagement with the flange 30d of the cone 30 by means of a spring 34 which surrounds the collar section 32a and extends between the flange 30c and an upper face of the clamping section 32b. The spring 33 is a heavy spring while this spring 34 need only be a light spring.

In use, the magazines 20 are loaded with duplex spokes 4 and the rim 2 is located on the seat 14a so that certain of the apertures 8 are aligned with the outer ends of the bores 18a in the blocks 14, the points of the spokes 4 in the magazines 20 also being aligned with the bores 18a. The hub 6 is placed on the jig 10 on the pin 19 and located in its desired position by the pins 16.

An insert 36 is located on the nose portion 28 and hand or foot operation of an air valve (not shown) operates all the pneumatic piston and cylinder arrangements 25 to cause spokes 4 to be inserted through the apertures 8 in the rim 2 and through the bores 18a past the pins 16 such that the ends of the limbs 4b of the spokes 4 extend over the upper end of the hub 6.

Operation of the press tool completes the formation of one side of the wheel, the sequence of actions during the descent of the ram 22 being as follows:

Firstly, the rim 2 is clamped and centralised by the rim clamp 32, the pressure exerted being that of the spring 34. Further descent of the ram 22 brings the clamping section 30b of the cone 30 into contact with the spokes 4 to clamp same against the upper end of the hub 6. The force exerted is that of the spring 33.

Further descent of the ram 22 presses the insert 36 and the nose portion 28 of the pin 24 into contact with the ends of the spokes 4 which project over the open end of the hub 6. The spokes 4 are bent downwards into the hub 6 and are positively anchored between the insert 36 and the inner face of the hub 6 because the insert 36 is of such dimensions that it is force fitted into the hub 6.

Ascent of the ram 22 reverses the sequence leaving the insert 36 in the hub 6. The half completed wheel is then removed from the jig 10, turned over, and replaced in the jig 10, and the operation is then repeated with the remaining apertures 8 of the rim 2 aligned with the magazines 20 and the bores 18a in the blocks 14.

It will be appreciated that when the piston and cylinder arrangements 25 are operated the limbs of the duplex spokes are brought by means (not shown) into parallelism before being inserted into the rim 2. During insertion the limbs 4b are resiliently bent and only assume their original straight form once the spokes 4 are properly located in the blocks 14.

During formation of the first side of the wheel the force exerted on the spokes 4 will cause the centreline of the rim 2 to be positioned above the centreline of the hub 6. When the wheel is turned over the centreline of the hub 6 will obviously then be above the centreline of the rim 2 and it is first of all necessary to deflect the hub 6 until the centreline is below the centreline of the rim 2. This is achieved by means of the cone 30 which deflects the hub 6 until it is stopped by the annulus 12 and the spokes 4, which are locked to the now lower end of the hub 6, are put under considerable tension. On completion of the formation of the other side of the wheel the hub 6 recoils to a central position so that the tension of the spokes 4 on both sides of the wheel is equalised.

For completion of the wheel in a single operation an additional series of magazines 20 and piston and cylinder arrangements 25 are provided such that a number of spokes 4 can be inserted and guided by suitably angled blocks 14 to the lower end of the hub 6 at the same time as spokes 4 are guided to the upper end of the hub 6. The central pin 19 is mounted on an additional hydraulic ram (not shown) and loading takes place as before except that another insert 36 is placed on the pin 19.

In operation, with the additional hydraulic ram in a retracted position, the ram 22 descends to lock the spokes 4 to the upper end of the hub 6 in the manner previously described. A cam (not shown) operable by an air or hydraulic cylinder lowers the jig 10 by approximately one-eighth inch. As this would be under the bias of the spring 34, the latter must be of a heavier type of spring than that used in the operation previously described in relation to FIG. 6. The spokes 4 at the upper end of the hub 6 are tensioned by this action.

The pin 19 then ascends by means of its ram to lock the spokes 4 to the lower end of the hub 6 in the same manner as described in relation to the upper end. The assembly is then opened and the completed wheel removed.

In a modification the spokes may be welded to the hub by providing upper and lower electrodes supporting end caps between which the hub is located. Sensors are provided to respond to the duplex spokes so that when the spokes are in position the welding operation begins.

The limbs 4b of each duplex spoke 4 of the wheel may be parallel or may cross each other, or diverge from the head portion 4a, or converge from the head portion 4a, or may diverge from the head portion 4a and cross the adjacent limbs 4b of the next adjacent duplex spokes 4.

In an alternative limb arrangement both limbs 4b of each duplex spoke 4 are tangential to one side of the hub 6, which is an advantageous arrangement when the hub 6 is of large diameter as deflection beyond the elastic limit of the wire can be avoided.

The duplex spokes may be inserted manually into the jig, in which event it is advantageous to have a plurality of jigs for successive removable attachment to the welding machine so that the duplex spokes can be inserted into the rims which are located on the jigs while the latter are supported on separate turntables, and the welding machine can be successively fed with the loaded jigs.

By virtue of the invention, the manufacture of direct and tangential wire-spoked wheels is rendered easy and fast, and can readily be automated.

I claim:

1. Apparatus for use in manufacturing a wire-spoked wheel of the type comprising a hub, a rim surrounding the hub, means defining peripherally spaced apertures in the rim, and a series of wire spokes interconnecting the rim and the hub, said apparatus including a jig having peripherally disposed positioning means comprising a peripheral seat to receive the rim, peripherally spaced radial guide passages opening from the seat for alignment with the apertures in the rim, and means for securing the spokes to the hub comprising a press ram, a spoke clamp and a rim clamp supported on the press ram, the ram being so movable, and the spoke clamp and the rim being so slidably mounted relative to one another and to the ram, that, in sequence, when the ram is moved towards the jig, the rim clamp engages the rim, the spoke clamp engages the spokes to clamp same against one end of the hub, and the ram bends the spokes into said one end of the hub.

2. Apparatus as claimed in claim 1, wherein the press ram, the spoke clamp, and the rim clamp are coaxial with one another.

3. Apparatus as claimed in claim 1, wherein the press ram includes a pin extension on which are mounted the spoke clamp and the rim clamp, the pin extension having a free end on which is provided a nose portion for mounting an insert, said insert assisting in bending the spokes into the hub and being of such dimensions that it can be force fitted into said one end of the hub to positively anchor the spokes to the hub.

4. Apparatus as claimed in claim 3, wherein each of the spoke clamp and the rim clamp are spring biassed towards the free end of the pin extension, the biassing force on the spoke clamp cone being greater than the biassing force on the rim clamp.

5. Apparatus as claimed in claim 1, including a series of feed assemblies provided around the periphery of the jig and aligned with the guide passages, each feed assembly having means for stacking spokes and means for forcing the spokes radially inwardly through the apertures in the rim and subsequently through the guide passages for attachment to the hub.

6. Apparatus for use in manufacturing a wire-spoked wheel of the type comprising a hub, a rim surrounding the hub, means defining peripherally spaced apertures in the rim, and a series of wire spokes interconnecting the rim and the hub, said apparatus including a jig having peripherally disposed positioning means comprising a peripheral seat to receive the rim, peripherally spaced radial guide passages opening from the seat for alignment with the apertures in the rim, means for forcing the spokes radially inwards through the apertures in the rim and subsequently through the guide passages to the hub, and means for securing the spokes to the hub.

7. Apparatus as claimed in claim 6, wherein welding means are provided for welding the spokes to the hub.

* * * * *